(12) United States Patent
Benjebbour

(10) Patent No.: US 9,374,812 B2
(45) Date of Patent: Jun. 21, 2016

(54) RADIO BASE STATION AND RADIO COMMUNICATION METHOD

(71) Applicant: NTT DOCOMO, INC., Tokyo (JP)

(72) Inventor: Anass Benjebbour, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 152 days.

(21) Appl. No.: 14/357,581

(22) PCT Filed: Nov. 22, 2012

(86) PCT No.: PCT/JP2012/080277
§ 371 (c)(1),
(2) Date: May 13, 2014

(87) PCT Pub. No.: WO2013/077393
PCT Pub. Date: May 30, 2013

(65) Prior Publication Data
US 2014/0293950 A1    Oct. 2, 2014

(30) Foreign Application Priority Data

Nov. 25, 2011   (JP) ................................. 2011-257890

(51) Int. Cl.
*H04W 72/04* (2009.01)
*H04W 16/32* (2009.01)
(Continued)

(52) U.S. Cl.
CPC ............ *H04W 72/042* (2013.01); *H04W 16/32* (2013.01); *H04W 52/0206* (2013.01); *H04W 84/045* (2013.01)

(58) Field of Classification Search
CPC .................. H04W 16/24–16/32; H04W 92/20
See application file for complete search history.

(56) References Cited

U.S. PATENT DOCUMENTS

| 8,355,728 B2 * | 1/2013 | Jung ................ H04W 52/0206 455/422.1 |
| 2010/0169498 A1 * | 7/2010 | Palanki ................ H04W 16/14 709/228 |

(Continued)

FOREIGN PATENT DOCUMENTS

WO    2010/078273 A2    7/2010
WO    2011/136266 A1    11/2011

OTHER PUBLICATIONS

International Search Report for corresponding Application No. PCT/JP2012/080277, Feb. 26, 2013 (1 page).

(Continued)

*Primary Examiner* — Xavier Szewai Wong
(74) *Attorney, Agent, or Firm* — Osha Liang LLP

(57) ABSTRACT

To provide a radio communication method when a macro-base station and micro-base station are regarded as a plurality of transmission points and the plurality of transmission points performs downlink communications using a plurality of carriers, in the radio communication method of the invention, a macro-base station (10) forming a macro-cell determines whether or not a micro-base station transmits a non-data signal that is at least one of a synchronization signal, broadcast signal, measurement reference signal and downlink control signal using a capacity carrier (ST102), and transmits instruction information for instructing the micro-base station (20) to start transmission of the non-data signal using the capacity carrier to the micro-base station when it is determined that the micro-base station transmits the non-data signal (ST103), and the micro-base station (20) starts transmission of the non-data signal using the capacity carrier based on the instruction information from the macro-base station (10) (ST104).

13 Claims, 11 Drawing Sheets

(51) Int. Cl.
*H04W 52/02* (2009.01)
*H04W 84/04* (2009.01)

(56) References Cited

U.S. PATENT DOCUMENTS

| | | | | |
|---|---|---|---|---|
| 2011/0053613 A1* | 3/2011 | Zhou | ............... | H04W 64/00 |
| | | | | 455/456.5 |
| 2011/0092234 A1 | 4/2011 | Kim et al. | | |
| 2011/0237239 A1* | 9/2011 | Chou | ............... | H04W 48/08 |
| | | | | 455/422.1 |
| 2011/0275361 A1* | 11/2011 | Yavuz | ............ | H04W 52/143 |
| | | | | 455/422.1 |
| 2013/0005388 A1* | 1/2013 | Naka | ............ | H04W 52/244 |
| | | | | 455/522 |

OTHER PUBLICATIONS

3GPP TS 36.300 V10.5.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10);" Sep. 2011 (194 pages).

Decision of Final Rejection issued in the counterpart Japanese Patent Application No. 2011-257890, mailed Dec. 8, 2015 (6 pages).

Office Action issued in corresponding Japanese Application No. 2011-257890, mailed Sep. 8, 2015 (6 pages).

Ericsson et al.; "On technical aspects on Heterogeneous Networks"; 3GPP TSG RAN WG1 #59bis, R1-100061; Valencia, Spain; Jan. 18-Jan. 22, 2010 (4 pages).

* cited by examiner

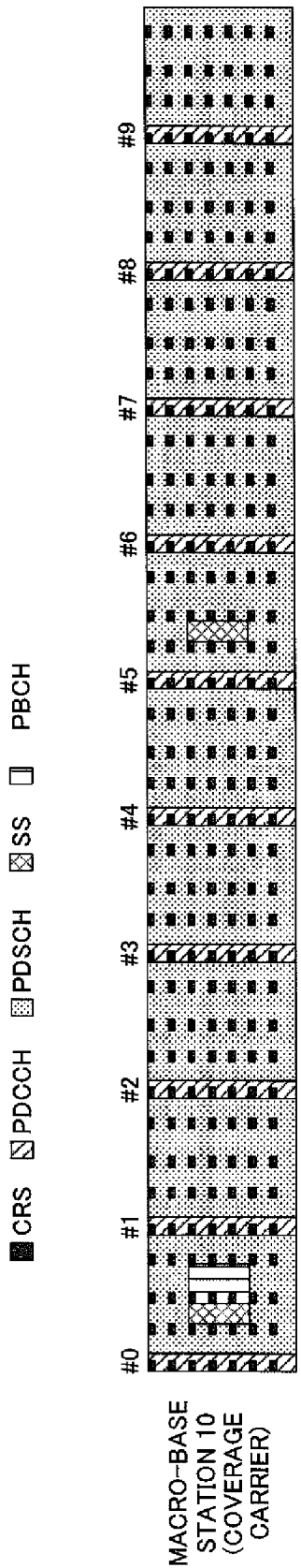
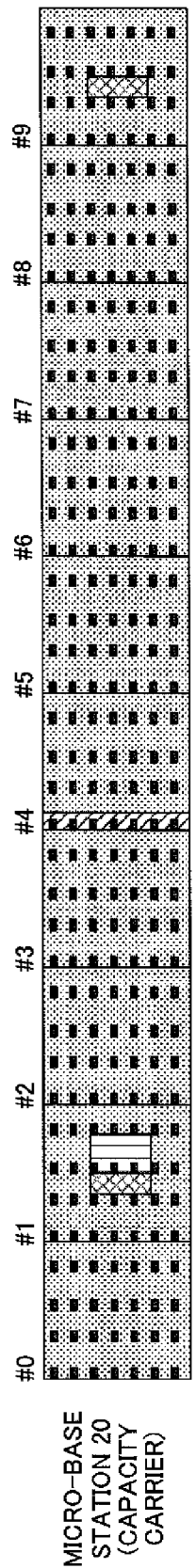
FIG. 2A
FIG. 2B

RADIO BASE STATION AND RADIO COMMUNICATION METHOD

TECHNICAL FIELD

The present invention relates to a radio base station and radio communication method in a radio communication system in which a micro-cell is overlaid and disposed in a macro-cell.

BACKGROUND ART

Currently, the 3GPP (Third Generation Partnership Project) has proceeded with the standardization of LTE-advanced (hereinafter, specifications of LTE Release 10 and subsequent specifications are collectively called "LTE-A") that is an evolved radio interface of LTE (Long Term Evolution) Release 8/9 specifications (hereinafter, referred to as LTE or Rel-8/9). LTE-A is aimed at actualizing higher system performance than LTE while keeping backward compatibility with LTE.

In LTE-A, having backward compatibility with LTE is one of requirements, and adopted is a transmission band having a plurality of base frequency blocks (hereinafter, referred to as component carriers (CCs)) each having a bandwidth usable in LTE. It is called carrier aggregation (for example, Non-patent literature 1) transmitting signals at the same time thus using a plurality of component carriers.

In LTE-A, a micro-cell (for example, pico-cell, femto-cell, relay cell, etc.) having a local coverage area with a radius of about several tens of meters is formed in a macro-cell having a wide-range coverage area with a radius of about several kilometers. Such a network configuration in which nodes with different power are overlaid is called HetNet (Heterogeneous Network). A radio base station forming the macro-cell is called the macro-base station, and a radio base station (pico-base station, femto-base station, relay base station, etc.) forming the micro-cell is called the micro-base station.

CITATION LIST

Non-Patent Literature

[Non-patent literature 1] 3GPP, TS36.300

SUMMARY OF THE INVENTION

Technical Problem

In the above-mentioned HetNet, it is also studied that the macro-base station and micro-base station are regarded as a plurality of transmission points and that the plurality of transmission points performs downlink communications using a plurality of carriers. More specifically, it is also studied that the macro-base station transmits a downlink signal using a coverage carrier and that the micro-base station transmits a downlink signal using a capacity carrier associated with the coverage carrier.

The present invention was made in view of such a respect, and it is an object of the invention to provide radio base stations suitable as a plurality of transmission points and radio communication method when a macro-base station and micro-base station are regarded as the plurality of transmission points and the plurality of transmission points performs downlink communications using a plurality of carriers.

Solution to Problem

A radio base station of the present invention is a radio base station forming a macro-cell to transmit a downlink signal using a first carrier where a micro-base station that transmits a data signal using a second carrier associated with the first carrier is disposed in the macro-cell, and is characterized by being provided with a determination section that determines whether or not the micro-base station transmits a non-data signal that is at least one of a synchronization signal, broadcast signal, measurement reference signal and downlink control signal using the second carrier, and a transmission section that transmits instruction information for instructing the micro-base station to start transmission of the non-data signal using the second carrier to the micro-base station when the determination section determines that the micro-base station transmits the non-data signal.

A radio base station of the invention is a radio base station that is disposed in a macro-cell to transmit a downlink signal using a first carrier and that transmits a data signal using a second carrier associated with the first carrier, and is characterized by being provided with a reception section that receives, from a macro-base station forming the macro-cell, instruction information for instructing the micro-base station to start transmission of a non-data signal that is at least one of a synchronization signal, broadcast signal, measurement reference signal and downlink control signal using the second carrier, and a transmission section that starts transmission of the non-data signal using the second carrier based on the received instruction information.

A radio communication method of the invention is a radio communication method in which a micro-base station that is disposed in a macro-cell to transmit a downlink signal using a first carrier transmits a data signal using a second carrier associated with the first carrier, and is characterized by having the steps of in a macro-base station forming the macro-cell, determining whether or not the micro-base station transmits a non-data signal that is at least one of a synchronization signal, broadcast signal, measurement reference signal and downlink control signal using the second carrier, in the macro-base station, transmitting instruction information for instructing the micro-base station to start transmission of the non-data signal using the second carrier to the micro-base station when it is determined that the micro-base station transmits the non-data signal, and in the micro-base station, starting transmission of the non-data signal using the second carrier based on the instruction information from the macro-base station.

Technical Advantage of the Invention

According to the present invention, it is possible to provide radio base stations suitable as a plurality of transmission points and radio communication method when a macro-base station and micro-base station are regarded as the plurality of transmission points and the plurality of transmission points performs downlink communications using a plurality of carriers.

BRIEF DESCRIPTION OF THE DRAWINGS

FIG. 2 contains explanatory views of a downlink physical channel configuration in HetNet;

DESCRIPTION OF EMBODIMENTS

Figure 1:
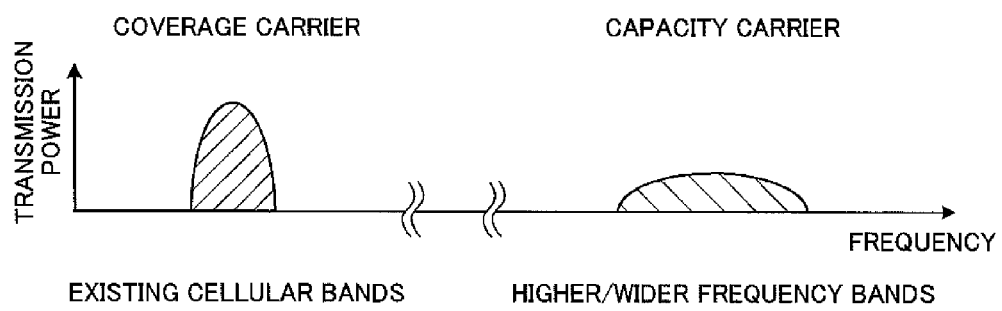
FIG. 1 is a conceptual diagram of HetNet.
Figure 1:
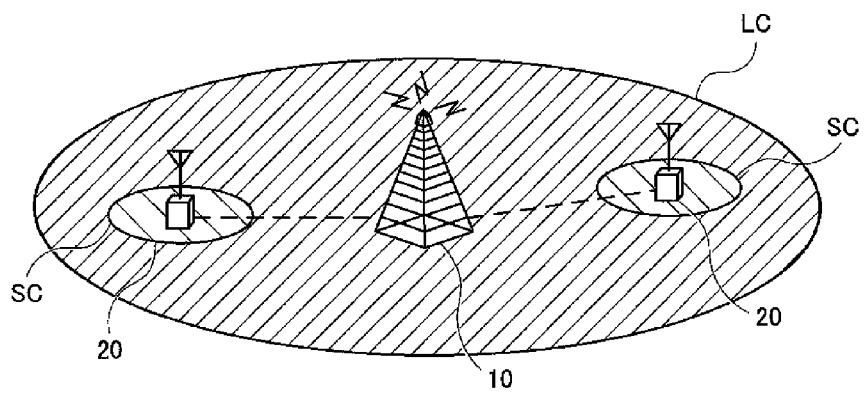

FIG. 1 illustrates a conceptual diagram of HetNet. As shown in FIG. 1, the HetNet is a hierarchical network in which cells of various forms of micro-cells (small cell: pico-cell, femto-cell, relay cell, etc.) SCs are overlaid in addition to a macro-cell (large cell) LC. In this HetNet, a macro-base station 10 forms the macro-cell LC having a relatively wide cover area, and a micro-base station 20 forms the local micro-cell SC smaller than the macro-cell LC. Further, the macro-base station 10 and micro-base station 20 are connected by a cable interface (for example, a high-speed channel of optical fibers or the like or a low-speed channel) or radio link.

In the HetNet as shown in FIG. 1, it is also studied that the macro-base station and micro-base station are regarded as a plurality of transmission points to perform downlink communications using different carriers. More specifically, it is studied that the macro-base station 10 transmits a downlink signal using a coverage carrier (first carrier) and that the micro-base station 20 transmits a downlink signal using a capacity carrier (second carrier) associated with the coverage carrier.

Herein, the coverage carrier is a carrier with a particular frequency band (for example, frequency band usable in Rel. 8/9). The coverage carrier is transmitted with relatively high transmission power so as to cover the wide macro-cell LC. Further, the coverage carrier is of a relatively low frequency band, and has a relatively narrow bandwidth (for example, 2 GHz). Furthermore, the coverage carrier has backward compatibility with Rel. 8/9.

Meanwhile, the capacity carrier is associated with the coverage carrier, and is a carrier with a frequency band (for example, in FIG. 1, frequency band higher than the coverage carrier) different from the coverage carrier. The capacity carrier is only required to cover the local micro-cell SC, and therefore, is transmitted with transmission power lower than that of the coverage carrier. Meanwhile, in order to allow high capacity, the capacity carrier has a bandwidth (for example, 3.5 GHz) wider than the coverage carrier. Further, the capacity carrier does not have backward compatibility with Rel. 8/9.

In addition, in the case of performing carrier aggregation with a plurality of component carriers as a transmission band, the coverage carrier and capacity carrier may be carriers of different component carriers. In this case, the capacity carrier is also called the extension carrier.

A downlink physical channel configuration in HetNet will be described next with reference to FIG. 2. FIG. 2A illustrates a physical channel configuration that the macro-base station 10 transmits using the coverage carrier. FIG. 2B illustrates a physical channel configuration that the micro-base station 20 transmits using the capacity carrier. In addition, in FIGS. 2A and 2B, a subframe is a predetermined transmission time unit (for example, 1 ms).

As shown in FIG. 2A, each subframe of the coverage carrier is comprised of a control region formed of maximum 3 OFDM symbols from the beginning, and a data region formed of remaining OFDM symbols. In the control region of the each subframe is transmitted a downlink control signal (Physical Downlink Control Channel (PDCCH)). In the data region of each subframe is transmitted a data signal (Physical Downlink Shared Channel (PDSCH)). Further, in the control region and data region of each subframe is also transmitted a measurement reference signal (Cell specific Reference Signal (CRS)).

Further, in the data region of a particular subframe of the coverage carrier, a synchronization signal (SS) and broadcast signal (Physical broadcast Channel (PBCH)) are transmitted at predetermined intervals. For example, in FIG. 2A, in the data region of subframes #0 and #5, the synchronization signal is transmitted in 6 resource blocks (1.08 MHz) of the center frequency of the coverage carrier at 5-subframe intervals. Further, in FIG. 2A, in the data region of the subframe #0, the broadcast signal is transmitted in 6 resource blocks (1.08 MHz) of the center frequency of the coverage carrier at predetermined intervals.

As described above, in the coverage carrier, non-data signals such as the synchronization signal, broadcast signal, measurement reference signal and downlink control signal are transmitted together with the user specific data signal.

Meanwhile, as shown in FIG. 2B, each subframe of the capacity carrier does not always have a control region of first maximum 3 OFDM symbols. This is because the capacity carrier is associated with the coverage carrier, and therefore, is desired to transmit only a user specific data signal basically.

In the capacity carrier, when there is a data signal to transmit from the micro-base station 20, as shown in a subframe #4 of FIG. 2B, provided is a control region (see the subframe #4 of FIG. 2B) of first maximum 3 OFDM symbols. Further, in the capacity carrier, when there is a data signal to transmit from the micro-base station 20, a downlink control signal may be transmitted in the data region of a particular subframe as a user specific control channel (E-PDCCH).

Further, in the data region of a particular subframe of the capacity carrier, a synchronization signal and broadcast signal are transmitted at predetermined intervals. For example, in FIG. 2B, the signal is transmitted in 6 resource blocks (1.08 MHz) of the center frequency of the capacity carrier at 8-subframe intervals. Further, in FIG. 2B, the signal is transmitted in 6 resource blocks (1.08 MHz) of the center frequency of the capacity carrier at predetermined intervals. Further, in each subframe, the measurement reference signal is also transmitted at predetermined intervals.

As described above, the capacity carrier is to mainly transmit user specific data signals to increase capacity. Accordingly, when there is no data signal (traffic) for the micro-base station 20 to transmit using the capacity carrier, for example, the micro-base station 20 does not need to transmit a non-data signal such as the synchronization signal, broadcast signal, measurement reference signal, and downlink control signal. The inventors of the present invention noted the respect that the micro-base station 20 does not need to always transmit a non-data signal using the capacity carrier, and arrived at the invention.

In a radio communication method according to the invention, the micro-base station 20 that is disposed in a macro-cell LC to transmit a downlink signal using the coverage carrier (first carrier) transmits a data signal using the capacity carrier (second carrier) associated with the coverage carrier. The macro-base station 10 forming the macro-cell LC determines whether or not the micro-base station 20 transmits a non-data signal that is at least one of a synchronization signal, broadcast signal, measurement reference signal and downlink control signal using the capacity carrier. Further, when it is determined that the micro-base station 20 transmits the non-data signal, the macro-base station 10 transmits instruction information for instructing the station 20 to start transmission of the non-data signal using the capacity carrier to the micro-base station 20. The micro-base station 20 starts transmission of the non-data signal using the capacity carrier based on the instruction information from the macro-base station 10.

According to the radio communication method according to the invention, the micro-base station 20 transmits a non-data signal that is at least one of a synchronization signal, broadcast signal, measurement reference signal and downlink control signal using the capacity carrier according to the instruction information from the macro-base station 10, and it is thereby possible to prevent the micro-base station 20 from transmitting a useless non-data signal. As a result, it is possible to reduce interference caused by transmission of a useless non-data signal from the micro-base station 20, and it is also possible to prevent power consumption of the micro-base station 20 from increasing.

Figure 3:
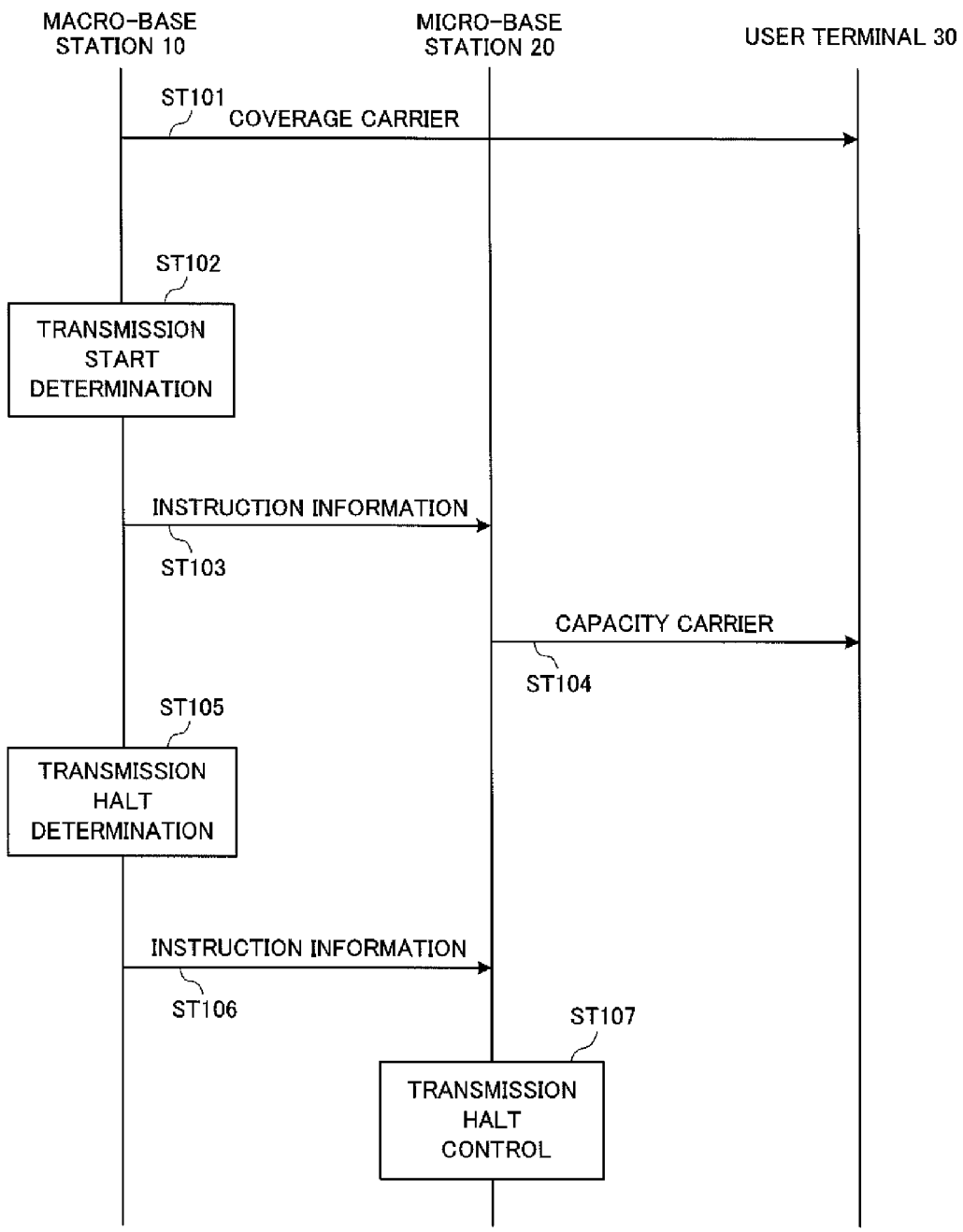
FIG. 3 is a sequence diagram illustrating a radio communication method according to the invention.

FIG. 3 is a sequence diagram to explain the radio communication method according to the invention. In FIG. 3, it is assumed that a user terminal 30 is positioned inside the macro-cell LC and micro-cell SC.

As shown in FIG. 3, the macro-base station 10 transmits a downlink signal to the user terminal 30 using the coverage carrier (ST101). More specifically, as described with reference to FIG. 2A, the macro-base station 10 transmits the data signal and non-data signal using the coverage carrier. As described above, the non-data signal is a signal different from the data signal, and for example, is at least one of the synchronization signal, broadcast signal, measurement reference signal and downlink control signal.

The macro-base station 10 determines whether or not the micro-base station 20 transmits the non-data signal using the capacity carrier (ST102). More specifically, the macro-base station 10 may determine whether or not the micro-base station 20 transmits the non-data signal, based on traffic information indicating whether or not the micro-base station 20 should transmit at least a part of data signals (traffic) transmitted in the macro-cell LC. For example, used as the traffic information are information (for example, reception signal quality from the micro-base station 20) of the micro-base station 20 detected in the user terminal 30, position information (that may include a relative position to the micro-base station 20 (or micro-cell SC)) of the user terminal 30, a list of IDs to identify the micro-base station 20 (or micro-cell SC) detected in the user terminal 30 and the like. The macro-base station 10 may determine that the micro-base station 20 transmits the non-data signal when reception signal quality from the micro-base station 20 as the traffic information is a predetermined threshold or more. Further, the macro-base station 10 may determine that the micro-base station 20 transmits the non-data signal when the position information of the user terminal 30 as the traffic information indicates that the terminal is in the micro-cell SC. Furthermore, the macro-base station 10 may determine that the micro-base station 20 transmits the non-data signal using the capacity carrier periodically, or transmits non-periodically.

When it is determined that the micro-base station 20 transmits the non-data signal, the macro-base station 10 transmits instruction information for instructing to start transmission of the non-data signal to the micro-base station 20 (ST103). In addition, when it is determined that the micro-base station 20 transmits the non-data signal periodically, the above-mentioned instruction information may include a transmission interval of the above-mentioned non-data signal and transmission start timing. Meanwhile, when it is determined that the micro-base station 20 transmits the non-data signal non-periodically, the above-mentioned instruction information may include bit information (for example, 1: transmission start, 0: transmission halt) for instructing a transmission start of the above-mentioned non-data signal.

Herein, the macro-base station 10 may transmit the above-mentioned instruction information to the micro-base station 20 via a cable interface (for example, X2 interface). In such a case, the macro-base station 10 and micro-base station 20 are assumed to be connected by a cable interface such as a high-speed channel of optical fibers or the like and a low-speed channel. For example, the macro-base station 10 may transmit the above-mentioned instruction information by higher layer signaling.

Alternatively, the macro-base station 10 may transmit the above-mentioned instruction information to the micro-base station 20 via a radio link (for example, radio link backhaul). For example, the macro-base station 10 may transmit the above-mentioned instruction information as a part of control information (for example, DCI (Downlink Control Information) and UCI (Uplink Control Information)) transmitted on the downlink control channel (PDCCH) of the coverage carrier. Alternatively, the macro-base station 10 may transmit the above-mentioned instruction information by higher layer signaling (for example, RRC signaling). In the case of transmitting by higher layer signaling, the above-mentioned instruction information is transmitted as a part of the downlink data channel (PDSCH) of the coverage carrier.

Based on the instruction information from the macro-base station 10, the micro-base station 20 starts transmission of the non-data signal using the capacity carrier (ST104). More specifically, as described with reference to FIG. 2B, the micro-base station 20 transmits the data signal and non-data signal using the capacity carrier. As described above, the non-data signal is a signal different from the data signal, and for example, is at least one of the synchronization signal, broadcast signal, measurement reference signal and downlink control signal.

The macro-base station 10 determines whether or not the micro-base station 20 halts transmission of the non-data signal using the capacity carrier (ST105). More specifically, the macro-base station 10 may determine whether or not the micro-base station 20 halts transmission of the non-data signal, based on the above-mentioned traffic information. For example, when the reception signal quality from the micro-base station 20 as the traffic information is a predetermined threshold or less, the macro-base station 10 may determine that the micro-base station 20 halts transmission of the non-data signal. Further, when the position information of the user terminal 30 as the traffic information indicates out of the micro-cell SC, the macro-base station 10 may determine that the micro-base station 20 halts transmission of the non-data signal.

In addition, in ST105, the macro-base station 10 may determine whether or not to change the transmission interval of the non-data signal from the micro-base station 20. For example, when there is no data signal transmitted from the micro-base station 20 using the capacity carrier, the macro-base station 10 determines to change the transmission interval of the non-data signal from the micro base station 20 to be longer. Alternatively, when a data amount transmitted from the micro-base station 20 using the capacity carrier is a predetermined threshold or less, the macro-base station 10 may determine to change the transmission interval of the non-data signal from the micro base station 20 to be longer.

When it is determined that the micro-base station 20 halts transmission of the non-data signal, the macro-base station 10 transmits instruction information for instructing the station 20 to halt transmission of the non-data signal to the micro-base station 20 (ST106). In addition, in ST105, when it is determined that the transmission interval of the non-data signal from the micro-base station 20 is changed, the macro-base station 10 may transmit instruction information for instructing the station 20 to change the transmission interval of the non-data signal to the micro-base station 20.

Based on the instruction information from the macro-base station 10, the micro-base station 20 halts transmission of the non-data signal using the capacity carrier (ST107). In addition, in ST107, based on the instruction information from the macro-base station 10, the micro-base station 20 may change the transmission interval of the non-data signal using the capacity carrier.

According to the radio communication method as shown in FIG. 3, the micro-base station 20 transmits a non-data signal that is at least one of a synchronization signal, broadcast signal, measurement reference signal and downlink control signal using the capacity carrier according to the instruction information from the macro-base station 10, and it is thereby possible to prevent the micro-base station 20 from transmitting a useless non-data signal. As a result, it is possible to reduce interference caused by transmission of a useless non-data signal from the micro-base station 20, and it is also possible to prevent power consumption of the micro-base station 20 from increasing.

A radio communication system according to Embodiments of the present invention will specifically be described next. In the radio communication system according to the Embodiment of the invention, coexist an LTE system having a relatively narrow system band (for example, maximum 20 MHz) and an LTE-A system having a system band obtained by combining a plurality of base frequency blocks (hereinafter, referred to as component carriers) with the system band of the LTE system as one unit. By combining maximum 5 component carriers, the LTE-A system has a system band of maximum 100 MHz. Thus combining a plurality of component carriers to broaden the band is called carrier aggregation. In addition, the LTE-A system may be called IMT-Advanced or may be called 4G.

As a radio access scheme of the radio communication system according to the Embodiments of the invention, OFDMA (Orthogonal Frequency Division Multiple Access) is applied in downlink, while SC-FDMA (Single Carrier-Frequency Division Multiple Access) is applied in uplink, and the uplink radio access scheme is not limited thereto. OFDMA is a multicarrier transmission scheme for dividing a frequency band into a plurality of narrow frequency bands (subcarriers), and mapping data to each subcarrier to perform communications. SC-FDMA is a single-carrier transmission scheme for dividing the system band into bands comprised of a single or consecutive resource blocks for each terminal so that a plurality of terminals uses mutually different bands, and thereby reducing interference among the terminals.

Example 1

Figure 4:
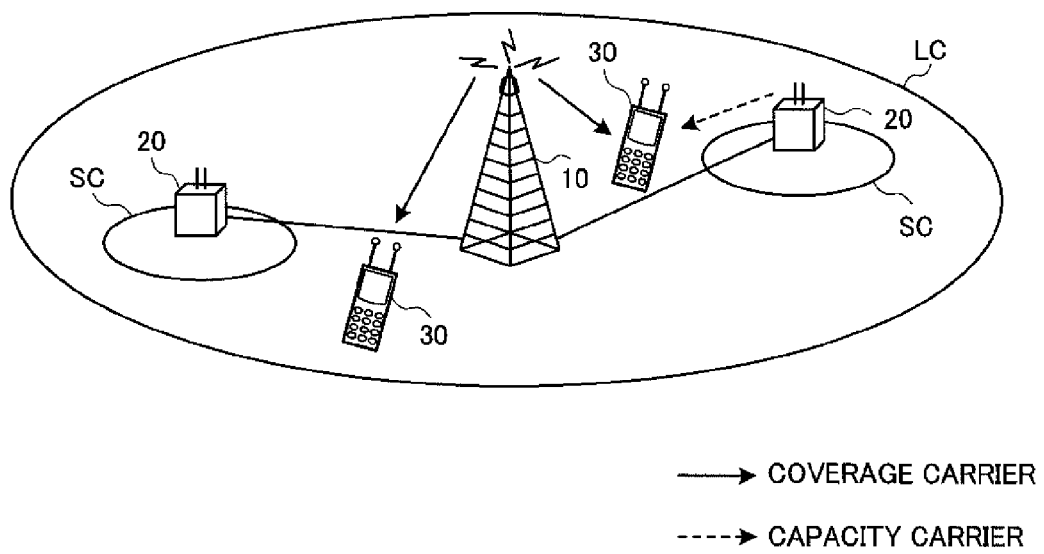
FIG. 4 is an explanatory view of a system configuration of a radio communication system according to Example 1.

A radio communication system according to Example 1 will be described next with reference to FIGS. 4 to 7. FIG. 4 is an explanatory diagram of a system configuration of the radio communication system according to Example 1. The radio communication system as shown in FIG. 4 is HetNet to overlay the micro-cell SC in the macro-cell LC.

As shown in FIG. 4, in the radio communication system having the HetNet configuration, the macro-base station 10 performs communications using the coverage carrier with the user terminal 30 positioned in the macro-cell LC. Further, the micro-base station 20 performs communications using the capacity carrier with the user terminal 30 positioned in the micro-cell SC.

As described above, the coverage carrier is a carrier with a particular frequency band. The coverage carrier is transmitted with relatively high transmission power so as to cover the wide macro-cell LC. Meanwhile, the capacity carrier is associated with the coverage carrier, and is a carrier with a frequency band different from the coverage carrier. The capacity carrier is only required to cover the local micro-cell SC, and therefore, is transmitted with transmission power lower than that of the coverage carrier. Further, the coverage carrier and capacity carrier may be carriers of different component carriers.

In the radio communication system as shown in FIG. 4, the macro-base station 10 and micro-base station 20 are connected by a cable (for example, a high-speed channel of optical fibers or the like or a low-speed channel). In addition, as a transmission interface to connect the macro-base station 10 and micro-base station 20, for example, an X2 interface is used.

Further, in the radio communication system as shown in FIG. 4, the macro-base station 10 is connected to a core network apparatus (for example, mobility management entity (MME), serving gateway (S-GW) or the like) not shown. The micro-base station 20 (for example, pico-base station) may be connected directly to the core network apparatus not shown, or may be connected via the macro-base station 10. Further, the micro-base station 20 (for example, femto-base station) may be connected to the Internet via a broadband channel not shown.

Furthermore, in the radio communication system as shown in FIG. 4, the user terminal 30 supports both LTE and LTE-A. Therefore, the user terminal 30 positioned in both the macro-cell LC and the micro-cell SC is capable of concurrently receiving a downlink signal using the coverage carrier from the macro-base station 10 and a downlink signal using the capacity carrier from the micro-base station 20.

Figure 5:
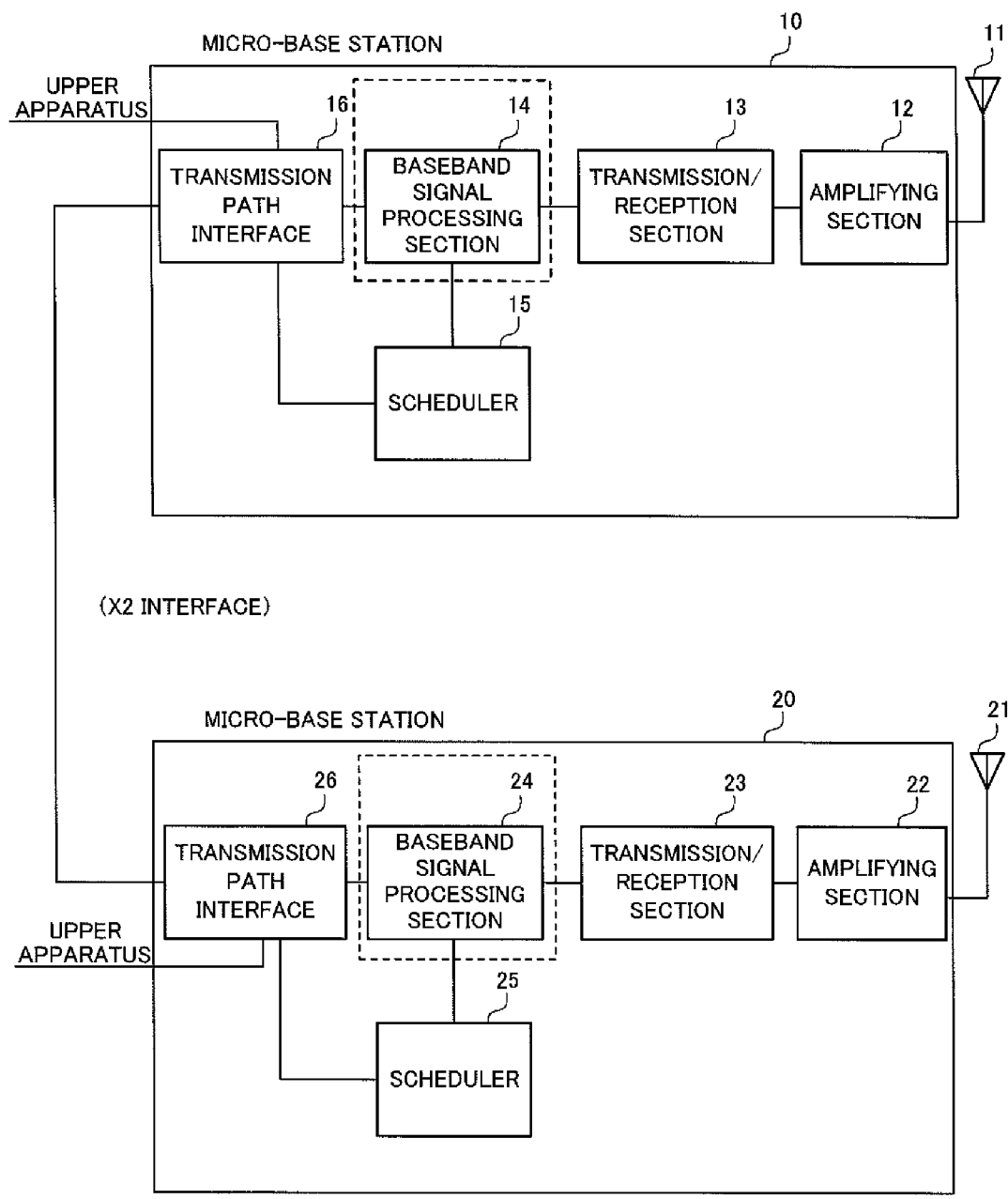
FIG. 5 is a schematic configuration diagram of a macro-base station and micro-base station according to Example 1.

A schematic configuration of the macro-base station and micro-base station according to Example 1 will be described with reference to FIG. 5. FIG. 5 is a schematic configuration diagram of the macro-base station and micro-base station according to Example 1. As the micro-base station 20 of Example 1, for example, used are the pico-base station and femto-base station.

The macro-base station 10 is provided with a transmission/reception antenna 11, an amplifying section 12 that amplifies a signal received/transmitted in the transmission/reception antenna 11, a transmission/reception section 13 which transmits and receives signals via the transmission/reception antenna 11, a baseband signal processing section 14, a scheduler 15 that performs resource allocation to the user terminal 30, and a transmission path interface 16 connected to an upper apparatus via a cable interface (for example, S1-U interface and S1-MME interface), while being connected to the micro-base station 20 via a cable interface (for example, X2 interface).

Downlink data transmitted from the macro-base station 10 to the user terminal is input to the baseband signal processing section 14 from the upper apparatus via the transmission path interface 16. The baseband signal processing section 14 performs baseband processing (for example, retransmission control, transmission format selection, channel coding, IFFT (Inverse Fast Fourier Transform), precoding, etc.) on the input downlink data. The transmission/reception section 13 converts the frequency of the baseband signal output from the baseband signal processing section 14 into a radio frequency band to transmit via the amplifying section 12 and transmission/reception antenna 11.

Meanwhile, an uplink signal transmitted from the user terminal 30 to the macro-base station 10 is input to the transmission/reception 13 via the transmission/reception antenna 11 and amplifying section 12. The uplink signal is subjected to frequency conversion in the transmission/reception section 13 and is output to the baseband signal processing section 14. The baseband signal processing 14 performs baseband processing (for example, FFT (Fast Fourier Transform), error correcting decoding, retransmission control, etc.) on the input uplink signal, and outputs the decoded uplink data to the upper apparatus via the transmission path interface. 16.

The micro-base station 20 is provided with a transmission/reception antenna 21, an amplifying section 22 that amplifies a signal received/transmitted in the transmission/reception antenna 21, a transmission/reception section 23 which transmits and receives signals via the transmission/reception antenna 21, a baseband signal processing section 24, a scheduler 25, and a transmission path interface 26 connected to the upper apparatus via a cable interface (for example, S1-U interface and S1-MME interface), while being connected to the macro-base station 10 via a cable interface (for example, X2 interface).

In addition, configurations of the transmission/reception antenna 21, amplifying section 22, transmission/reception section 23, and baseband signal processing section 24 of the micro-base station 20 are basically the same as those of the transmission/reception antenna 11, amplifying section 12, transmission/reception section 13, and baseband signal processing section 14 of the macro-base station 10. The scheduler 25 controls resource allocation to the user terminal 30 under control of the micro-cell SC, while also working together with the scheduler 15 of the macro-base station 10. Further, although not shown in the figure, the transmission path interface 26 may be connected to the upper apparatus via a cable interface.

Detailed functional configurations of the macro-base station and micro-base station according to Example 1 will be described with reference to FIGS. 6 and 7.

Figure 6:
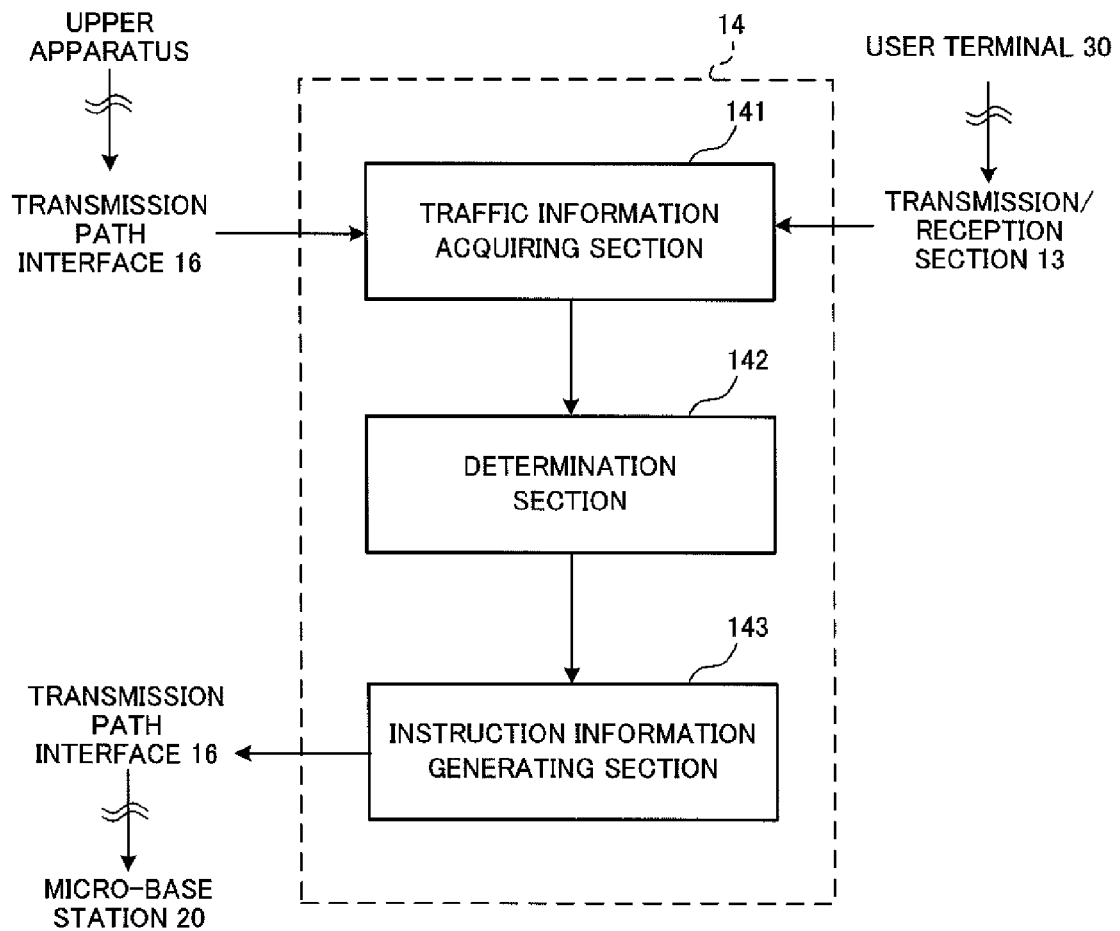
FIG. 6 is a functional configuration diagram of the macro-base station according to Example 1.

FIG. 6 is a functional configuration diagram of the macro-base station according to Example 1. The functional configuration as shown in FIG. 6 is mainly related to the baseband signal processing section 14 of FIG. 5. As shown in FIG. 6, the macro-base station 10 is provided with a traffic information acquiring section 141, determination section 142, and instruction information generating section 143.

The traffic information acquiring section 141 acquires traffic information indicating whether or not the micro-base station 20 should transmit at least a part of data signals (traffic) transmitted in the macro-cell LC. For example, as the traffic information, there are position information of the user terminal 30, information (for example, reception signal quality from the micro-base station 20) of the micro-base station 20 detected in the user terminal 30, position information (including a relative position to the micro-cell) of the user terminal 30, information of a list of IDs of micro-cells found by the user terminal 30 and the like.

More specifically, the traffic information acquiring section 141 may acquire the traffic information (for example, information of the micro-base station 20 detected in the user terminal 30) reported from the user terminal 30 via the transmission/reception section 13. Alternatively, the traffic information acquiring section 141 may acquire the traffic information (for example, position information of the user terminal 30) reported from the upper apparatus via the transmission path interface 16. The traffic information acquiring section 141 outputs the acquired traffic information to the determination section 142.

The determination section 142 determines whether or not the micro-base station 20 transmits the non-data signal using the capacity carrier. As described above, the non-data signal is at least one of the synchronization signal, broadcast signal, measurement reference signal and downlink control signal.

More specifically, the determination section 142 may determine whether or not the micro-base station 20 transmits the non-data signal using the capacity carrier, based on the traffic information acquired in the traffic information acquiring section 141. For example, in the case of indicating that the micro-base station 20 should transmit at least a part of data signals (traffic) transmitted in the macro-cell LC (for example, in the case where the position information of the user 30 is inside the micro-cell SC of the micro-base station 20, or in the case where the reception signal quality of the micro-base station 20 detected in the user terminal 30 is a predetermined threshold or more), the determination section 142 may determine that the micro-base station 20 transmits the non-data signal using the capacity carrier.

Further, the determination section 142 may determine whether or not the micro-base station 20 transmits the non-data signal using the capacity carrier periodically. For example, when the non-data signal is at least one of the synchronization signal, broadcast signal and measurement reference signal, the section 142 determines that the non-data signal is transmitted periodically. In addition, when it is determined that the non-data signal is transmitted periodically, instruction information generated in the instruction information generating section 143 described later may include a transmission interval of the non-data signal and transmission start timing.

Furthermore, the determination section 142 may determine whether or not the micro-base station 20 transmits the non-data signal using the capacity carrier non-periodically. For example, when the non-data signal is the measurement reference signal, the section 142 determines that the non-data signal is transmitted non-periodically. In addition, when it is determined that the non-data signal is transmitted non-periodically, instruction information generated in the instruction information generating section 143 described later may include bit information for instructing transmission of the non-data signal.

Still furthermore, the determination section 142 may determine whether or not the micro-base station 20 halts transmission of the non-data signal using the capacity carrier. For example, in the case where the above-mentioned traffic information indicates that the micro-base station 20 should not transmit at least a part of data signals (traffic) transmitted in the macro-cell LC (for example, in the case where the position information of the user 30 is out of the micro-cell SC of the micro-base station 20, or in the case where the reception signal quality of the micro-base station 20 detected in the user terminal 30 is less than the predetermined threshold), the determination section 142 determines that the micro-base station 20 halts transmission of the non-data signal.

Moreover, the determination section 142 may determine whether or not to change the transmission interval of the non-data signal from the micro-base station 20 using the capacity carrier. For example, in the case where the traffic information acquiring section 142 detects there is no data signal transmitted from the micro-base station 20, the determination section 142 determines to change the transmission interval of the non-data signal from the micro base station 20 to be longer. Alternatively, in the case where the traffic information acquiring section 141 detects that a data amount transmitted from the micro-base station 20 using the capacity carrier is a predetermined threshold or less, the macro-base station 10 may determine to change the transmission interval of the non-data signal from the micro-base station 20 to be longer.

In the case where the determination section 142 determines that the micro-base station 20 transmits the non-data signal using the capacity carrier, the instruction information generating section 143 generates the instruction information for instructing the micro-base station 20 to start transmission of the non-data signal. The instruction information generating section 143 outputs the generated instruction information to the transmission path interface 16. The instruction information is transmitted to the micro-base station 20 from the transmission path interface 16 (transmission section).

Figure 7:
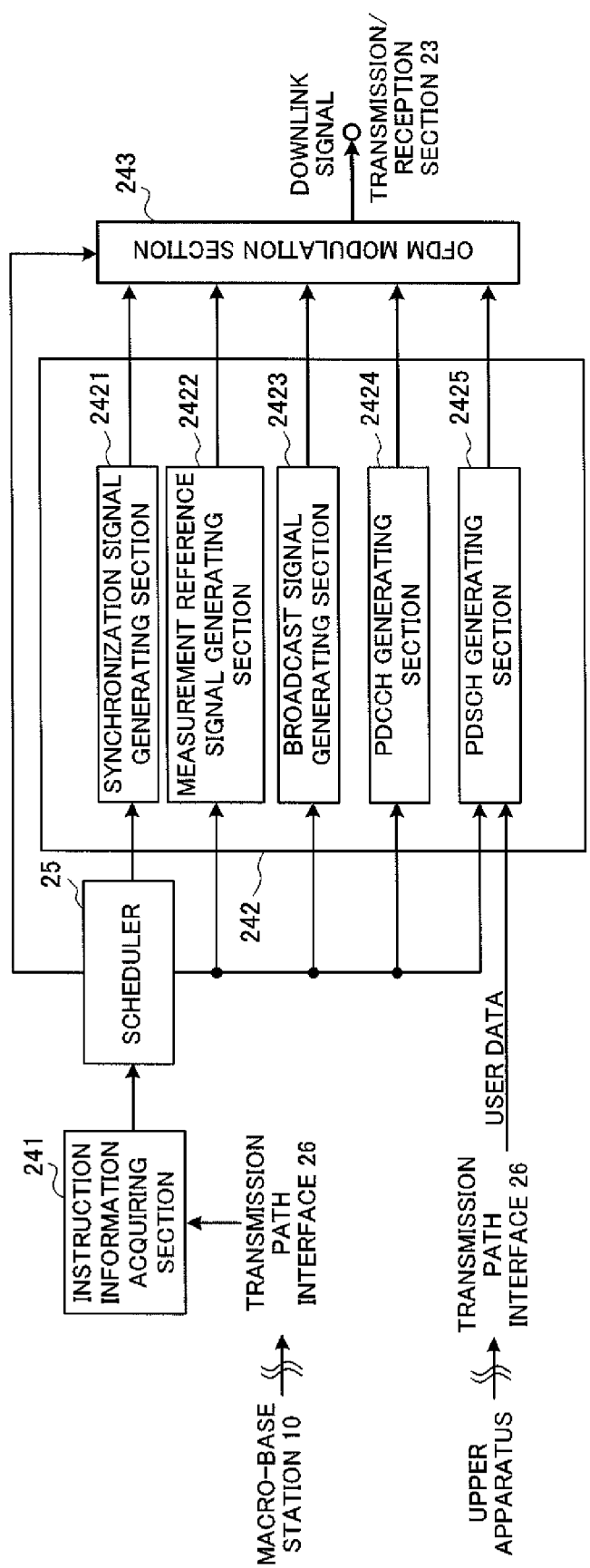
FIG. 7 is a functional configuration diagram of the micro-base station according to Example 1.

FIG. 7 is a functional configuration diagram of the micro-base station according to Example 1. The functional configuration as shown in FIG. 7 is mainly related to the baseband signal processing section 24 of FIG. 5. As shown in FIG. 7 the micro-base station 20 is provided with an instruction information acquiring section 241, channel signal generating section 242 and OFDM modulation section 243.

The instruction information acquiring section 241 acquires the instruction information from the macro-base station 10 via the transmission path interface 26 (reception section).

The channel signal generating section 242 has a synchronization signal generating section 2421, measurement reference signal generating section 2422, broadcast signal generating section 2423, PDCCH generating section 2424, and PDSCH generating section 2425.

The synchronization signal generating section 2421 generates a synchronization signal according to an instruction from the scheduler 25. More specifically, the synchronization signal generating section 2421 generates a synchronization signal to be disposed in a subframe instructed from the scheduler 25. In addition, the synchronization signal may include a PSS (Primary Synchronization Signal) and SSS (Secondary Synchronization Signal) as well as the SS (Synchronization Signal).

The measurement reference signal generating section 2422 generates a measurement reference signal according to an instruction from the scheduler 25. More specifically, the measurement reference signal generating section 2422 generates a measurement reference signal to be disposed in a subframe instructed from the scheduler 25. In addition, the measurement reference signal may include a UE specific RS, DM-RS and CSI-RS as well as the CRS.

The broadcast signal generating section 2423 generates a broadcast signal according to an instruction from the scheduler 25. More specifically, the broadcast signal generating section 2423 generates a broadcast signal to be disposed in a subframe instructed from the scheduler 25. In addition, the broadcast signal includes the PBCH, and an MIB (Master Information Block) is transmitted on the PBCH.

The PDCCH generating section 2424 generates a downlink control signal according to an instruction from the scheduler 25. More specifically, the PDCCH generating section 2424 generates a downlink control signal to be disposed in a subframe instructed from the scheduler 25. In addition, the downlink control signal includes the PDCCH, and DCI (Downlink Control Information) and UCI (Uplink Control Information) is transmitted on the PDCCH. Further, the downlink control signal may include the E-PDCCH (Enhanced-PDCCH) transmitted in the data region (OFDM symbols except first maximum 3 OFDM symbols) of a subframe.

The PDSCH generating section 2425 generates a data signal according to an instruction from the scheduler 25. More specifically, the PDSCH generating section 2425 generates a data signal to be disposed in a subframe instructed from the scheduler 25. In addition, the data signal may include not only the user data but also signaling information of a higher layer (for example, RRC signaling).

The scheduler 25 performs scheduling of signals generated in the channel signal generating section 242. More specifically, based on the user data received from the upper apparatus, the scheduler 25 instructs the PDSCH generating section 2425 to generate a data signal. Further, based on the instruction information acquired in the instruction information acquiring section 241, the scheduler 25 instructs the synchronization signal generating section 2421, measurement reference signal generating section 2422, broadcast signal generating section 2423, and PDCCH generating section 2424 to generate a synchronization signal, measurement reference signal, broadcast signal and downlink control signal, respectively. By thus performing scheduling of the synchronization signal, measurement reference signal, broadcast signal and downlink control signal based on the instruction information acquired in the instruction information acquiring section 241, the scheduler 25 controls a transmission start, transmission halt and change of the transmission interval of the synchronization signal, measurement reference signal, broadcast signal and downlink control signal.

The OFDM modulation section 243 maps a downlink signal including other downlink channel signals and uplink resource allocation information signal to subcarriers, performs Inverse Fast Fourier Transform (IFFT), adds a CP, and thereby generates a downlink signal. The OFDM modulation section 243 outputs the generated downlink signal to the transmission/reception section 23 (transmission section). The downlink signal output to the transmission/reception section 23 is transmitted using the capacity carrier via the amplifying section 22 and transmission/reception antenna 21.

As described above, in the radio communication system in Example 1, the macro-base station 10 transmits the instruction information for instructing the station 20 to start transmission of the non-data signal using the capacity carrier to the micro-base station 20 via the cable interface (for example, X2 interface). Further, based on the instruction information from the macro-base station 10, the micro-base station 20 transmits the non-data signal using the capacity carrier. Accordingly, it is possible to prevent the micro-base station 20 from transmitting a useless non-data signal. As a result, it is possible to reduce interference caused by transmission of a useless non-data signal from the micro-base station 20, and it is also possible to prevent power consumption of the micro-base station 20 from increasing.

Example 2

A radio communication system according to Example 2 will be described next with reference to FIGS. 8 to 11. The radio communication system according to Example 2 differs from Example 1 in the respect that the macro-base station 10 and micro-base station 20 are connected by a radio link. In the following description, the description will be given with particular emphasis on the different respect from Example 1.

Figure 8:
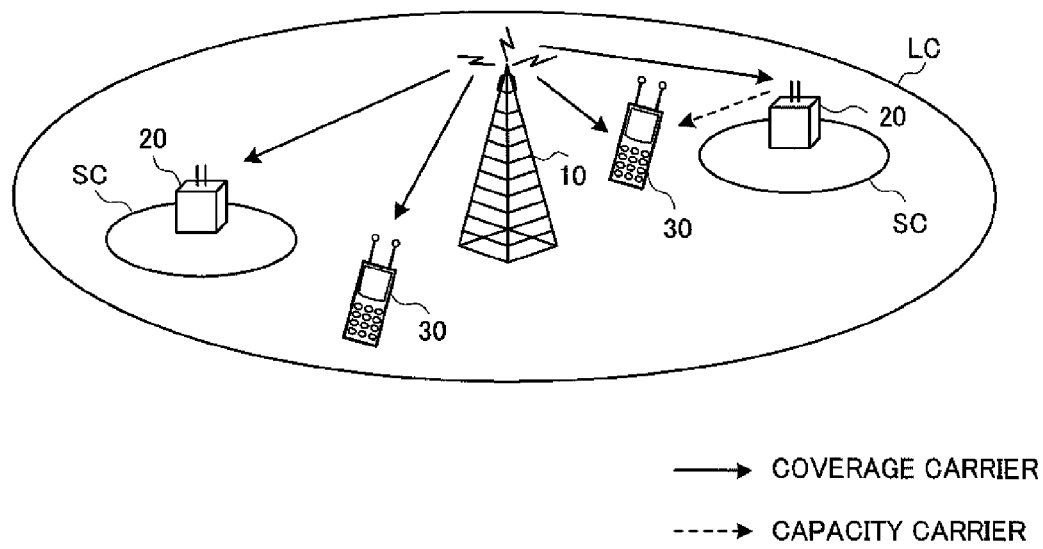
FIG. 8 is an explanatory view of a system configuration of a radio communication system according to Example 2.

FIG. 8 is an explanatory diagram of a system configuration of the radio communication system according to Example 2. As shown in FIG. 8, the macro-base station 10 and micro-base station 20 according to Example 2 are not connected by a cable interface, and in this respect, differ from Example 1.

Figure 9:
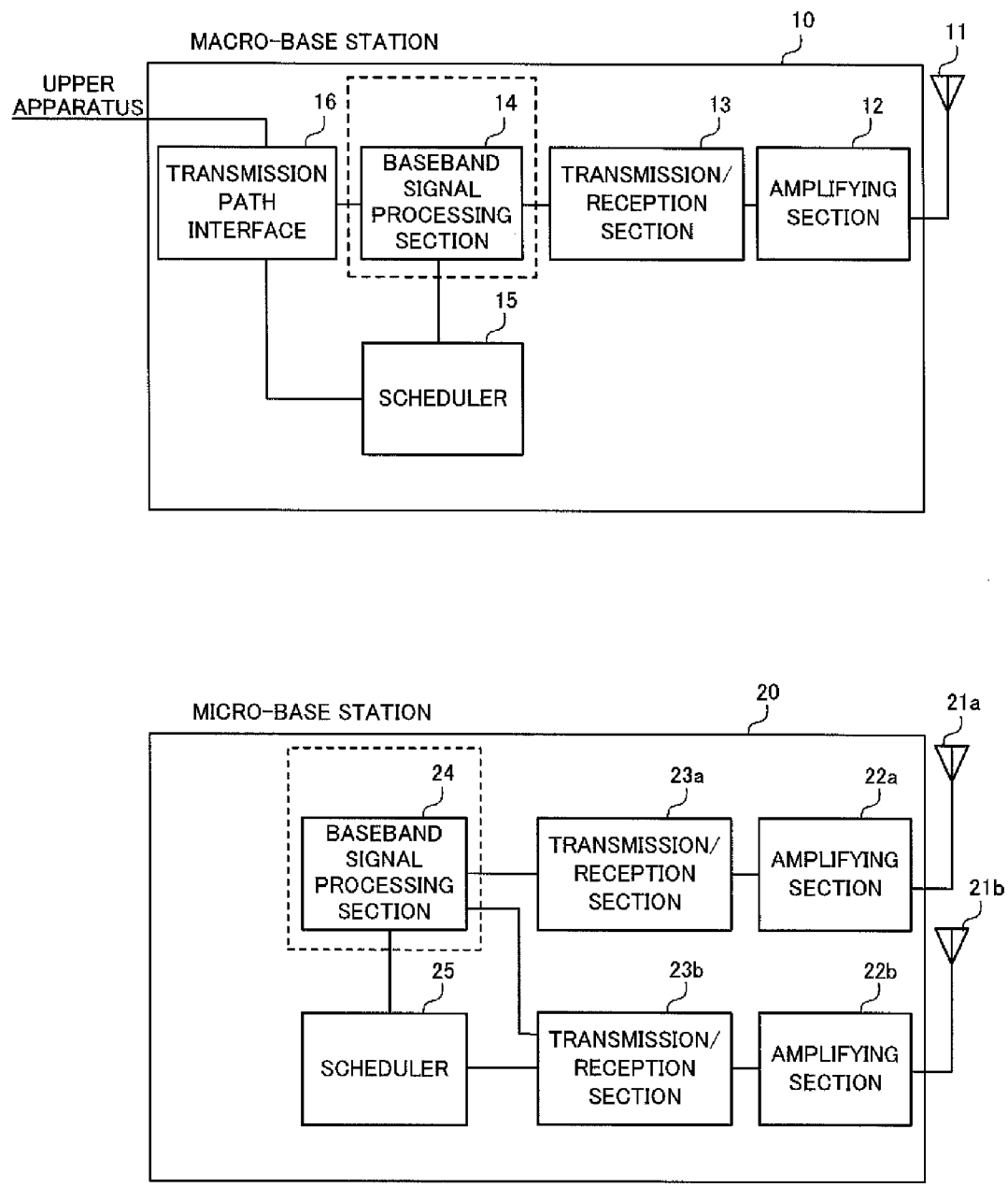
FIG. 9 is a schematic configuration diagram of a macro-base station and micro-base station according to Example 2.

FIG. 9 is a schematic configuration diagram of the macro-base station and micro-base station according to Example 2. The macro-base station 10 and micro-base station 20 perform radio communications via radio link backhaul, and in this respect, differ from Example 1. Particularly, the micro-base station is controlled using the coverage carrier as the radio link backhaul. Therefore, the micro-base station 20 according to Example 2 is provided with a transmission antenna 21b, amplifying section 22b and transmission/reception section 23b to perform communications using the coverage carrier, in addition to a transmission antenna 21a, amplifying section 22a and transmission/reception section 23a to perform communications using the capacity carrier. As the micro-base station 20 of Example 2, for example, a relay base station is used.

Figure 10:
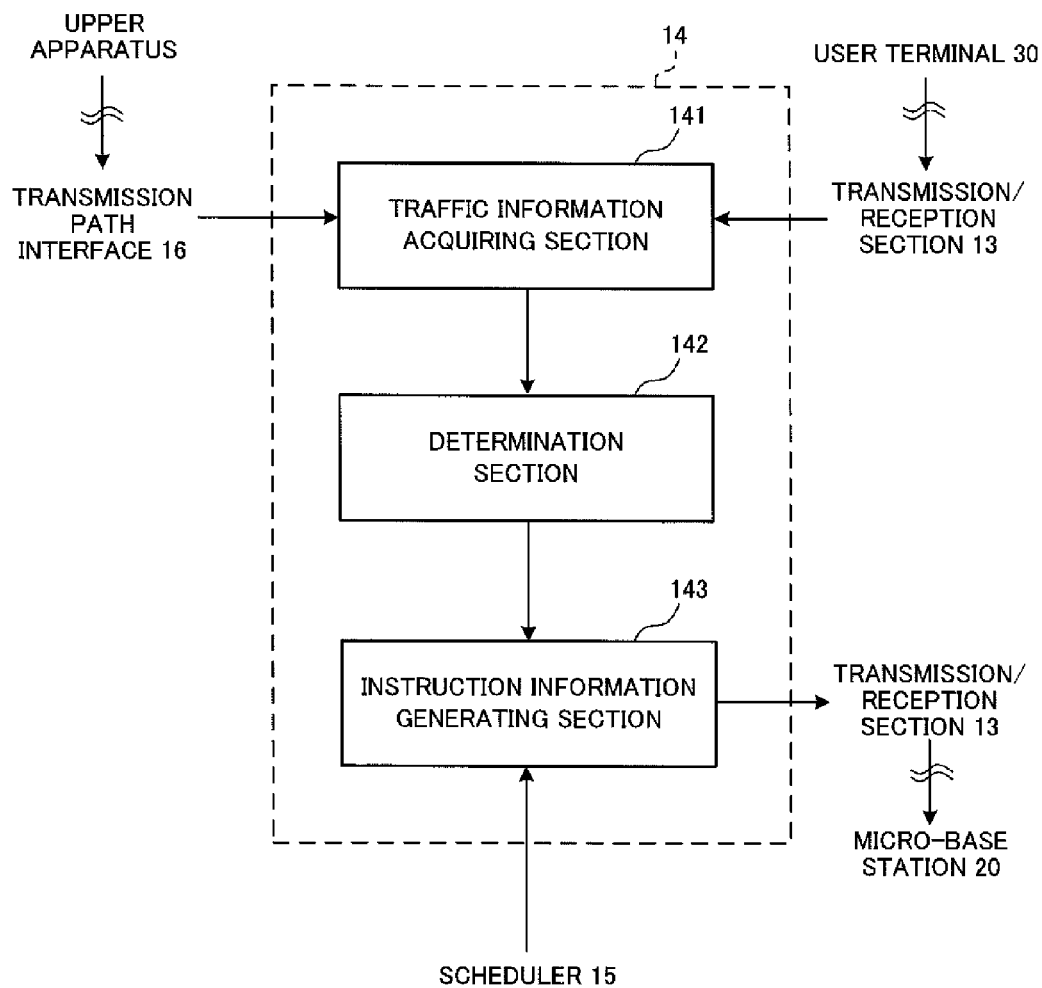
FIG. 10 is a functional configuration diagram of the macro-base station according to Example 2.

FIG. 10 is a functional configuration diagram of the macro-base station according to Example 2. As shown in FIG. 10, the instruction information generating section 143 of the macro-base station 10 according to Example 2 generates instruction information according to an instruction from the scheduler 15. The instruction information generating section 143 outputs the generated instruction information to the transmission/reception section 13 (transmission section).

The scheduler 15 performs scheduling of the instruction information generated in the instruction information generating section 143. In addition, the instruction information generated in the instruction information generating section 143 may be scheduled as a part of the downlink control channel (PDCCH). Alternatively, when the instruction information is transmitted by higher layer signaling (for example, RRC signaling), the instruction information may be scheduled as a part of the downlink data channel (PDSCH).

The instruction information output to the transmission/reception section 13 is transmitted using the coverage carrier via the amplifying section 12 and transmission/reception antenna 11.

Figure 11:
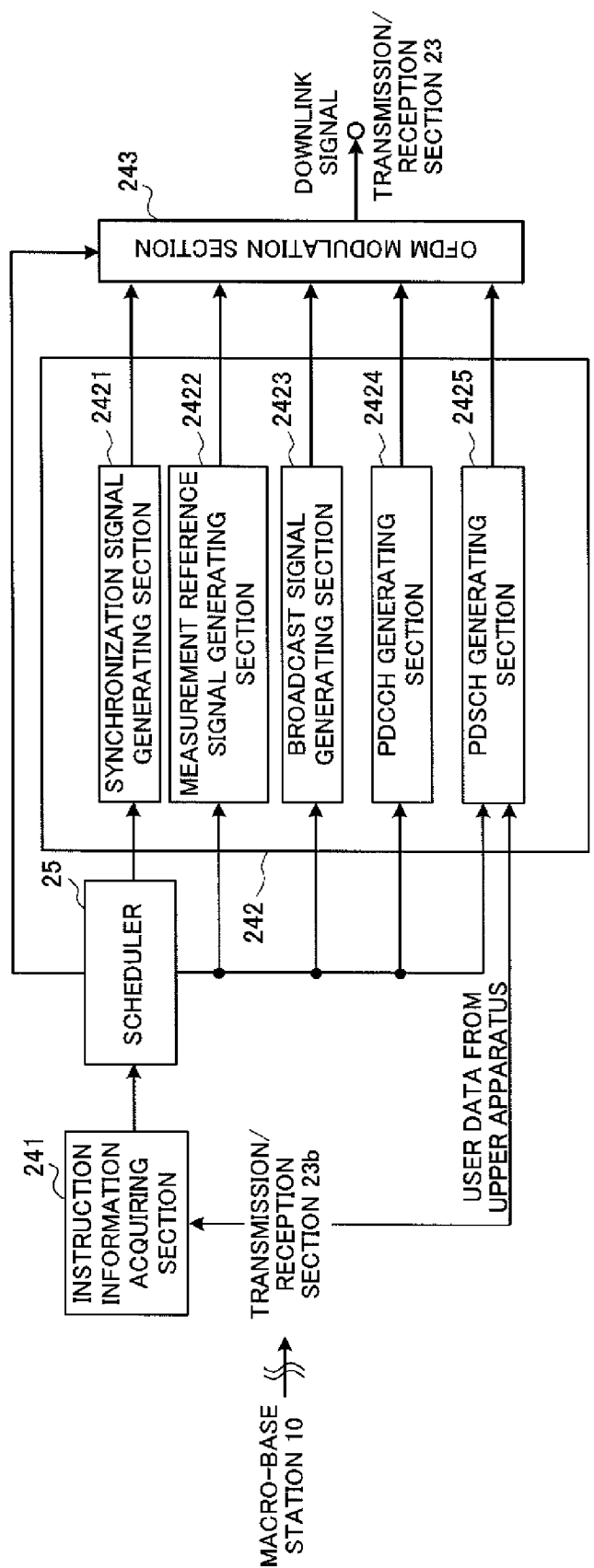
FIG. 11 is a functional configuration diagram of the micro-base station according to Example 2.

FIG. 11 is a functional configuration diagram of the micro-base station according to Example 2. As shown in FIG. 11, the instruction information acquiring section 241 of the micro-base station 20 according to Example 2 acquires the instruction information received in the transmission/reception section 23b (reception section) using the coverage carrier, and in this respect, differs from Example 1. Further, a downlink signal generated in the OFDM modulation section 243 is output to the transmission/reception section 23a. The downlink signal output to the transmission/reception section 23a is transmitted using the capacity carrier via the amplifying section 22a and transmission/reception antenna 21a.

As described above, in the radio communication system in Example 2, the macro-base station 10 transmits the instruction information for instructing the station 20 to start transmission of the non-data signal using the capacity carrier to the micro-base station 20 by a radio link (for example, radio link backhaul) (particularly, using the coverage carrier). Further, based on the instruction information from the macro-base station 10, the micro-base station 20 transmits the non-data signal using the capacity carrier. Accordingly, it is possible to prevent the micro-base station 20 from transmitting a useless non-data signal. As a result, it is possible to reduce interference caused by transmission of a useless non-data signal from the micro-base station 20, and it is also possible to prevent power consumption of the micro-base station 20 from increasing.

In the above-mentioned descriptions, the present invention is specifically described using the above-mentioned Embodiments, but it is obvious to a person skilled in the art that the invention is not limited to the Embodiments described in the Description. For example, in the above-mentioned Embodiments, the number of users and the number of processing sections in the apparatus are not limited thereto, and are capable of being modified as appropriate corresponding to the apparatus configuration. Further, the invention is capable of being carried into practice as modified and changed aspects without departing from the subject matter and scope of the invention defined by the descriptions of the scope of the claims. Accordingly, the descriptions of the Description are intended for illustrative explanation, and do not have any restrictive meaning to the invention.

The present application is based on Japanese Patent Application No. 2011-257890 filed on Nov. 25, 2011, entire content of which is expressly incorporated by reference herein.

The invention claimed is:

1. A radio base station forming a macro-cell to transmit a downlink signal including a data signal using a first carrier where a micro-base station that transmits a data signal using a second carrier associated with the first carrier is disposed in the macro-cell, comprising:
   a determination section that determines whether or not the micro-base station transmits a non-data signal that is at least one of a synchronization signal, a broadcast signal, a measurement reference signal and a downlink control signal using the second carrier; and
   a transmission section that transmits instruction information for instructing the micro-base station to start transmission of the non-data signal using the second carrier to the micro-base station when the determination section determines that the micro-base station transmits the non-data signal,
   wherein the determination section determines whether or not the micro-base station transmits the non-data signal non-periodically, and when the determination section determines that the micro-base station transmits the non-data signal non-periodically, the instruction information includes bit information for instructing a transmission start of the non-data signal.

2. The radio base station according to claim 1, further comprising:
   a traffic information acquiring section that acquires traffic information indicating whether or not the micro-base station transmits at least a part of the data signal transmitted in the macro-cell,
   wherein the determination section determines whether or not the micro-base station transmits the non-data signal, based on the traffic information acquired in the traffic information acquiring section.

3. The radio base station according to claim 2, wherein the traffic information is reception signal quality from the micro-base station in a user terminal reported from the user terminal, and when the reception signal quality is a predetermined threshold or more, the determination section determines that the micro-base station transmits the non-data signal.

4. The radio base station according to claim 2, wherein the traffic information is position information of a user terminal, and when the position information of the user terminal indicates inside the micro-cell, the determination section determines that the micro-base station transmits the non-data signal.

5. The radio base station according to claim 1, wherein the determination section determines whether or not the micro-base station halts transmission of the non-data signal using the second carrier, and when it is determined that the micro-base station halts transmission of the non-data signal, the transmission section transmits instruction information for instructing the micro-base station to halt transmission of the non-data signal using the second carrier to the micro-base station.

6. The radio base station according to claim 1, wherein the determination section determines whether or not to change a transmission interval of the non-data signal from the micro-base station using the second carrier, and when it is determined that the transmission interval of the non-data signal from the micro-base station is changed, the transmission section transmits instruction information for instructing the micro-base station to change the transmission interval of the non-data signal using the second carrier to the micro-base station.

7. The radio base station according to claim 1, wherein the transmission section transmits the instruction information to the micro-base station via a cable interface.

8. The radio base station according to claim 1, wherein the transmission section transmits the instruction information to the micro-base station via a radio link.

9. The radio base station according to claim 8, wherein the transmission section transmits the instruction information as a part of control information transmitted on a downlink control channel of the first carrier.

10. The radio base station according to claim 7, wherein the transmission section transmits the instruction information by higher layer signaling.

11. A radio base station that is disposed in a macro-cell to transmit a downlink signal using a first carrier and that transmits a data signal using a second carrier associated with the first carrier, comprising:
    a reception section that receives, from a macro-base station forming the macro-cell, instruction information for instructing the radio base station micro base station to start transmission of a non-data signal that is at least one of a synchronization signal, a broadcast signal, a measurement reference signal and a downlink control signal using the second carrier; and
    a transmission section that starts transmission of the non-data signal using the second carrier based on the received instruction information,
    wherein the macro-base station determines whether or not the radio base station transmits the non-data signal non-periodically, and when the macro-base station determines that the radio base station transmits the non-data signal non-periodically, the instruction information includes bit information for instructing a transmission start of the non-data signal.

12. The radio base station according to claim 11, wherein the reception section receives instruction information for instructing the radio base station to halt transmission of the non-data using the second carrier from the macro-base station, and based on the received instruction information, the transmission section halts transmission of the non-data signal using the second carrier.

13. A radio communication method for a micro-base station that is disposed in a macro-cell to transmit a downlink signal using a first carrier and that transmits a data signal using a second carrier associated with the first carrier, comprising:
    in a macro-base station forming the macro-cell, determining whether or not the micro-base station transmits a non-data signal that is at least one of a synchronization signal, a broadcast signal, a measurement reference signal and a downlink control signal using the second carrier;
    in the macro-base station, transmitting instruction information for instructing the micro-base station to start transmission of the non-data signal using the second carrier to the micro-base station when it is determined that the micro-base station transmits the non-data signal; and
    in the micro-base station, starting transmission of the non-data signal using the second carrier based on the instruction information from the macro-base station,
    wherein the macro-base station determines whether or not the micro-base station transmits the non-data signal non-periodically, and when the macro-base station determines that the micro-base station transmits the non-data signal non-periodically, the instruction information includes bit information for instructing a transmission start of the non-data signal.

* * * * *